US006553139B1

(12) United States Patent
Kaup (10) Patent No.: US 6,553,139 B1
(45) Date of Patent: Apr. 22, 2003

(54) COMPUTER-ASSISTED PROCESS AND DEVICE FOR PROCESSING THE IMAGE POINTS OF AN IMAGE SEGMENT

(75) Inventor: André Kaup, Höhenkirchen-Siegertsbrunn (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/202,992

(22) PCT Filed: Jun. 13, 1997

(86) PCT No.: PCT/DE97/01209

§ 371 (c)(1),
(2), (4) Date: Sep. 27, 1999

(87) PCT Pub. No.: WO97/50254

PCT Pub. Date: Dec. 31, 1997

(30) Foreign Application Priority Data

Jun. 25, 1996 (DE) .......................................... 196 25 402

(51) Int. Cl.[7] .................................................. G06K 9/00
(52) U.S. Cl. ........................ 382/167; 382/173; 382/248
(58) Field of Search ................................ 382/164, 166, 382/167, 173, 180, 243, 250, 248, 174, 175, 176, 177, 178, 179, 242, 244, 245, 246, 247, 249, 276, 256, 232; 375/240.16

(56) References Cited

U.S. PATENT DOCUMENTS

| 5,613,013 A | * | 3/1997 | Schuette ..................... 382/124 |
| 5,768,405 A | * | 6/1998 | Makram-Ebeid ............ 382/128 |
| 5,867,602 A | * | 2/1999 | Zandi et al. ................. 382/248 |
| 6,044,165 A | * | 3/2000 | Perona et al. ............... 382/103 |

FOREIGN PATENT DOCUMENTS

| DE | 41 36 636 | 7/1993 |
| EP | 0 649 258 A2 | 4/1995 |

OTHER PUBLICATIONS

Luis Torres et al. (Signal Processing V Theories and Application Barcelona, Spain, Sep. 18–21, 1990).*
J.–R. Ohm, "Digitale Bildcodierung", Springer, Berlin, ISBN 3–540–58579–6, pp. 32–49.
R.J. Clarke, "Transform Coding of Images", Academic Press, London, 1985, pp. 72–134.
T. Sikora et al., "Shape–Adaptive DCT for Generic Coding of Video", IEEE Transactions on Circuits and Systems for Video Tech., vol. 5, No. 1, Feb. 1995, pp. 59–62.
T. Sikora et al., "Efficiency of Shape–Adaptive 2–D Transforms for Coding of Arbitrarily Shaped Image Segments", IEEE Transactions on Circuits and Systems for Video Tech., vol. 5, No. 3, 1995, pp. 254–258.

(List continued on next page.)

Primary Examiner—Jayanti K. Patel
Assistant Examiner—Ali Bayat
(74) Attorney, Agent, or Firm—Bell Boyd & Lloyd LLC (57) ABSTRACT

A method and an apparatus are proposed for the signal extrapolation of brightness values and/or color values of pixels of a first image segment onto pixels of a second image segment, which may each have any desired shape. The extrapolation is carried out in such a way (202) that a signal profile of the brightness values and/or of the color values of the pixels of the second image segment is smoothed (203) and that the signal profile of the brightness values and/or the color values of the pixels of the second image segment is adapted (204) to the brightness values and/or to the color values of the pixels of the first image segment in a boundary region between the first image segment and the second image segment.

13 Claims, 6 Drawing Sheets

OTHER PUBLICATIONS

I. Donescu et al., "A comparison of efficient methods for the coding of arbitrarily shaped image segments", Procedding of Picture Coding Symposium, Melbourne, pp. 181–186.

Gilge et al., "Coding of Arbitrarily Shaped Image Segments Based on a Generalized Orthogonal Transform", Signal Processing: Image Communication 1, pp. 153–180.

Kaup et al., "Segment Oriented Coding of Textured Images Based on Successive Approximation", 1994 International Symposium on Speech, Image Processing and Neural Networks, Apr. 13–16, 1994, Hong Kong, pp. 196–201.

Sanei et al., "Adapting Transform Coding to Texturally Segmented Images", Proceedings of the Asilomar Conference on Signals, Systems and Computers, Nov. 1991, pp. 1205–1209.

Yu et al., "Pictorial Transform Coding for Tessellating Arbitrary Shaped Regions", Signal Processing V: Theories and Applications, Barcelona, Sep. 1990, pp. 901–904.

* cited by examiner

COMPUTER-ASSISTED PROCESS AND DEVICE FOR PROCESSING THE IMAGE POINTS OF AN IMAGE SEGMENT

BACKGROUND OF THE INVENTION

1. Field of the Invention

The present invention relates generally to a method for processing of pixels of an image segment by a computer, and in particular for signal extrapolation of brightness values and/or color values of pixels of a first image segment onto pixels of a second image segment, and to an apparatus for practicing the method.

2. Description of the Related Art

The coding of video signals in accordance with, for example, the picture coding standards H.261, H.263, MPEG1 and MPEG2 is frequently based on a block-oriented discrete cosine transform (DCT). However, these block-oriented image coding methods are not suitable for image coding methods which are not based on rectangular blocks but rather in which, for example, objects are segmented from an image and the image segments are coded. These methods are referred to as region-based or object-based image coding methods. In this case, digital images are segmented in a manner corresponding to the objects appearing in the scene. Separate coding of these segmented objects is carried out instead of the coding of picture blocks as in the case of block-based image coding methods. In this case, the coding is usually effected by modeling of the segmented objects and subsequent transmission of the modeling parameters of these segmented objects.

After the image information has been transmitted from a transmitter to a receiver, the individual objects of the image are reconstructed again in the receiver using the modeling parameters that have been transmitted.

One possibility for modeling the objects consists in a series expansion of the image function in accordance with a set of suitably selected base functions. The modeling parameters then correspond to the expansion coefficients of this image function. Such image modeling is the foundation of transform coding. If the intention is to code individual image objects having any desired boundary, a transformation for segments having any desired boundary (as a rule not convex) is necessary.

Two fundamental approaches have existed hitherto for such a transformation.

In the method which is described in the publication by M. Gilge, T. Engelhardt and R. Mehlan, Coding of arbitrarily shaped image segments based on a generalized orthogonal transform, Signal Processing: Image Communication 1, pp. 153–180, October 1989, the given image segment is first of all embedded in a circumscribing rectangle having the smallest possible dimensioning. For this rectangle it is possible to specify a discrete cosine transform (DCT) which is completely specified by the base functions of the transformation. In order to adapt this transformation to the segment shape, the base functions defined on the rectangle are successively orthogonalized with regard to the shape of the segment. The resulting orthogonal, shape-dependent base functions then form the segment-adapted transformation sought.

One disadvantage of this solution approach may be seen in the fact that the implementation of this method requires a great deal of computing power and of memory space. Furthermore, this known method has the disadvantage that reliable statements cannot be made about the suitability of the resulting transformation for the purpose of data compression since the transformation essentially depends on the orthogonalization sequence, and thus on the specific implementation of the method.

The publication by T. Sikora and Béla Makai, Shape-adaptive DCT for generic coding of video, IEEE Trans. Circuits and Systems for Video Technology 5, pp. 59–62, February 1995 describes a method in which the given image segment is transformed separately according to rows and columns. For this purpose, all the lines of the image segment are first of all aligned on the left and successively subjected to a one-dimensional horizontal transformation whose transformation length corresponds in each case to the number of pixels in the corresponding line. The resulting coefficients are then transformed a further time in the vertical direction.

This method conceals the disadvantage, in particular, that the correlations of the brightness values of the pixels (similarities of the pixels) cannot be completely utilized on account of the resorting of the pixels.

In order to improve this method disclosed in the two publications T. Sikora and Béla Makai, Shape-adaptive DCT for generic coding of video, IEEE Trans. Circuits and Systems for Video Technology 5, pp. 59–62, February 1995, and T. Sikora, S. Bauer and Béla Makai, Efficiency of shape-adaptive 2-D transforms for coding of arbitrary shaped image segments, IEEE Trans. Circuits and Systems for Video Technology 5, pp. 254–258, June 1995, describes a method in which a transformation for convex image segment shapes which is adapted for a simple image model is carried out. In this case, however, the only image segment shapes that are permitted are those which have no interruptions (holes) on traversing rows or columns.

The known methods described above furthermore have the disadvantage that owing to the variable transformation length, standard transformation methods and/or standard modules cannot be employed for carrying out the transformation.

Furthermore, I. Donescu et al., A Comparison of Efficient Methods for the Coding of Arbitrarily Shaped Image Segments, Proceedings of Picture Coding Symposium, Melbourne, pp. 13.–15.3. 1996, pp. 181–186, 1996, discloses assigning a predetermined, fixed brightness value to all the pixels of a square image segment with 8×8 pixels which do not belong to a first image segment which is at least partly contained in the square image segment.

This method primarily has two disadvantages.

Firstly, in the boundary region of the first image segment and the square image segment, it is possible for discontinuities of the signal profile of the brightness values to occur between pixels, thereby causing high-frequency spectral components, which leads to an undesirable and unnecessary, increased coding complexity and hence requirement for transmission capacity.

Secondly, this method is restricted to block-based methods with image segments having a square shape.

Since the standard image transformation methods cannot be employed, the methods disclosed in the publications M. Gilge, T. Engelhardt and R. Mehlan, Coding of arbitrarily shaped image segments based on a generalized orthogonal transform, Signal Processing: Image Communication 1, pp. 153–180, October 1989; T. Sikora and Béla Makai, Shape-adaptive DCT for generic coding of video, IEEE Trans. Circuits and Systems for Video Technology 5, pp. 59–62, February 1995; T. Sikora, S. Bauer and Béla Makai, Efficiency of shape-adaptive 2-D transforms for coding of arbitrary shaped image segments, IEEE Trans. Circuits and Systems for Video Technology 5, pp. 254–258, June 1995, incur considerable costs for encoding units which use the known methods described above.

Standard image transformation methods are disclosed in R. J. Clarke: Transform Coding of Images, Academic Press, London, pp. 72–134, 1985.

German Patent Document DE 41 36 636 A1 discloses a device for coding video signals which is used to implement signal extrapolation of a signal profile from a first picture area into a second picture area. The signal extrapolation is effected by mirroring the signal profile at d of the edge of the first picture area.

The publication by J.-R. Ohm, Digitale Bildcodierung [Digital ImageCoding], Springer, Berlin, ISBN 3-540-58579-6 pp. 32–49, 1995, demonstrates various possibilities for signal extrapolation: a periodic continuation, a symmetrical continuation and also a value-constant continuation of the signal profile.

All the methods disclosed in German Patent Document DE 41 36 636 A1 and the publication by J.-R. Ohm, Digitale Bildcodierung [Digital ImageCoding], Springer, Berlin, ISBN 3-540-58579-6 pp. 32–49, 1995, have the underlying disadvantage that in the event of a spectral transformation onto the entire signal, resulting from the signal profile and the extrapolated signal profile, an undesirably high number of high spectral components are produced and, consequently, a large number of spectral coefficients in the higher spectral domain arise, which must additionally be coded and transmitted.

SUMMARY OF THE PRESENT INVENTION

Consequently, the invention is based on the problem of providing a method for the processing of pixels of an image segment of any desired shape which has, as a result, image segments of an image-segment target shape, it being the case that in the image segments of the image-segment target shape, the signal profile of the brightness values and/or of the color values has, on the one hand, a smooth profile in the region which does not lie in the original image segment, and, on the other hand, has as far as possible no discontinuities in the signal profile in a boundary region between the original image segment and the region which does not lie in the original image segment.

The problem is solved by the method or the processing of pixels of a first image segment, which has any desired shape, by a computer, in which the pixels of the first image segment are assigned a brightness value and/or a color value, the brightness values and/or the color values are extrapolated onto pixels of a second image segment, which has any desired shape, the extrapolation is carried out in such a way that a signal profile of the brightness values and/or of the color values of the pixels of the second image segment is smoothed, and the extrapolation is carried out in such a way that the signal profile of the brightness values and/or of the color values of the pixels of the second image segment is adapted to the brightness values and/or to the color values of the pixels of the first image segment in a boundary region between the first image segment and the second image segment.

In the method, the pixels of a first image segment are assigned a brightness value and/or a color value, it being possible for the first image segment to have any desired shape. The brightness values and/or color values are extrapolated onto pixels of a second image segment likewise having any desired shape. In the course of the extrapolation, it is ensured that the signal profile of the brightness values and/or of the color values of the pixels in the second image segment is smoothed. Furthermore, the extrapolation is carried out in such a way that in a transition region of pixels of the first image segment and pixels of the second image segment, as far as possible no discontinuities occur in the signal profile of the brightness values and/or color values. This means that the boundary region between the first image segment and the second image segment is likewise smoothed during the extrapolation.

The method enables the signal profile of brightness values and/or color values of pixels of a first image segment to be extrapolated onto pixels of a second image segment, high spatial frequencies in the signal profiles and hence high spectral components and thus spectral coefficients for higher frequencies being avoided as far as possible. This leads to a reduction of spectral coefficients that usually have to be quantized, coded and transmitted. Consequently, a considerable saving is achieved in the quantization, coding and transmission of spectral coefficients in the coding of images.

Advantageous developments of the invention emerge from from a method in which a digital filter having a smoothing characteristic is used for the extrapolation. Preferably, the extrapolation of the brightness values and/or of the color values of the pixels of the second image segment is carried out on the basis of pixels of the second image segment which are adjacent to the pixels of the first image segment. A local mean value filter is used as the digital filter. Alternately, a median filter is used as the digital filter. The brightness values and/or the color values of the pixels of the second image segment may be initialized with a predeterminable value at the beginning of the method. The predeterminable value is produced from the one mean value of the brightness values and/or of the color values of the pixels of the first image segment.

Preferably, the method is carried out a number of times. For example, the method is carried out until, after an iteration, a sum of changes of at least some of the brightness values and/or of the color values of the pixels of the second image segment in comparison with at least one preceding iteration is less than a predeterminable first threshold value. Alternately, the method is carried out until, after an iteration, a mean value of changes of at least some of the brightness values and/or of the color values of the pixels of the second image segment in comparison with at least one preceding iteration is less than a predeterminable second threshold value. As a further alternative, the method is carried out until, after an iteration, a sum of changes of at least some of the brightness values and/or of the color values of the pixels of the second image segment in comparison with at least one preceding iteration is less than a preterminable third threshold value.

For the extrapolation, the first function is formed which has at least one first term and one second term, the first term is used to ensure that the signal profile of the brightness values and/or of the color values of the pixels of the first image segment is preserved as far as possible, the second term is used to ensure that the signal profile of the brightness values and/or of the color values of the pixels of the second image segment is smoothed, and the second term is used to ensure that the signal profile of the brightness values and/or of the color values of the pixels of the second image segment is adapted to the brightness values and/or to the color values of the pixels of the first image segment in a boundary region between the first image segment and the second image segment. The first term is determined from a difference between the signal profile of the brightness values and/or of the color values of the pixels of the first image segment and a signal profile supplemented onto the brightness values and/or the color values of the pixels of the second image segment. The second term is at least produced from any desired differentiation of a signal profile supplemented onto the brightness values and/or the color values of the pixels of the second image segment. The second term is at least produced from a second differentiation of the signal profile supplemented onto the brightness values and/or the color values of the pixels of the second image segment.

In this method, the supplemented signal profile is transformed into the spectral domain, the transformed, supplemented signal profile having spectral coefficients, an intermediate function is formed by inserting the transformed, supplemented signal profile) into the first function, a linear equation system is formed in that the intermediate function is differentiated with respect to the respective spectral coefficients and is set to be equal to zero, values of the spectral coefficients are determined by solving the linear equation system for the spectral coefficients.

Integer arithmetic may be used in the method. In one embodiment, the first image segment and the second image segment together have a square shape. The present method may be used in the context of transform encoding. Alternately, it is used in the context of a discrete cosine transform. As yet another alternative, it is used in the context of a wavelet transform. Further, it may be used in the context of a sub-band transform.

The present invention also provides an apparatus for the processing of pixels of a first image segment, which has any desired shape, having a computing unit which is set up in such a way that the pixels of the first image segment are assigned a brightness value and/or a color value, the brightness values and/or the color values are extrapolated onto pixels of a second image segment, which has any desired shape, the extrapolation is carried out in such a way that a signal profile of the brightness values and/or of the color values of the pixels of the second image segment is smoothed, and the extrapolation is carried out in such a way that the signal profile of the brightness values and/or the color values of the pixels of the second image segment is adapted to the brightness values and/or to the color values of the pixels of the first image segment in a boundary region between the first image segment and the second image segment.

The apparatus computing unit is set up in such a way that a digital filter having a smoothing characteristic is used for the extrapolation. Preferably, the computing unit is set up in such a way that the extrapolation of the brightness values and/or of the color values of the pixels of the second image segment is carried out on the basis of pixels of the second image segment which are adjacent to the pixels of the first image segment. A local mean value filter is used as the digital filter according to the invention, or a median filter is used as the digital filter instead.

In a preferred arrangment, the computing unit is set up in such a way that for the extrapolation, a first function is formed which has at least one first term and one second term, the first term is used to ensure that the signal profile of the brightness values and/or of the color values of the pixels of the first image segment is preserved as far as possible, the second term is used to ensure that the signal profile of the brightness values and/or of the color values of the pixels of the second image segment is smoothed, and the second term is used to ensure that the signal profile of the brightness values and/or of the color values of the pixels of the second image segment is adapted to the brightness values and/or to the color values of the pixels of the first image segment in a boundary region between the first image segment and the second image segment.

This computing unit is set up in such a way that the first term is determined from a difference between the signal profile of the brightness values and/or of the color values of the pixels of the first image segment and a signal profile supplemented onto the brightness values and/or the color values of the pixels of the second image segment. The second term is at least produced from any desired differentiation of a signal profile is supplemented onto the brightness values and/or the color values of the pixels of the second image segment. The second term is at least produced from a second differentiation of the signal profile supplemented onto the brightness values and/or the color values of the pixels of the second image segment.

In one example, the computing unit is set up in such a way that the supplemented signal profile is transformed into the spectral domain, the transformed, supplemented signal profile having spectral coefficients, an intermediate function is formed by inserting the transformed, supplemented signal profile into the first function, a linear equation system is formed in that the intermediate function is differentiated with respect to the respective spectral coefficients and is set to be equal to zero, and values of the spectral coefficients are determined by solving the linear equation system for the spectral coefficients.

Specific features of the invention provide that integer arithmetic is used in the method. The first image segment and the second image segment together have a square shape. The apparatus is used in the context of transform encoding, or in the context of a discrete cosine transform, or in the context of a wavelet transform, or in the context of a subband transform.

It is advantageous to use a digital filter having a smoothing characteristic for the extrapolation of the signal profile, in order to ensure the requirements for smoothing the signal profile. In this development of the method, the extrapolation of the signal profile is carried out completely in the space domain.

Furthermore, it is advantageous to use a local mean value filter as the digital filter, since optimum extrapolation with regard to the smoothing criteria is achieved by the mean value filter.

Moreover, it is advantageous to initialize the brightness values and/or color values of the pixels of the second image segment at the beginning of the method with a value, for example with the mean value of the brightness values and/or of the color values of the pixels of the first image segment. The result of the method is improved further in this way.

Furthermore, it is advantageous to carry out the method in a plurality of iterations, the smoothing properties thereby being improved further.

However, the method need not necessarily be carried out exclusively in the space domain; a variant is likewise provided in which a first function is formed which is composed at least of a first term and a second term, which are used to ensure, on the one hand, the criterion of faithfulness to the original of the first image segment and, on the other hand, the smoothness criteria during the extrapolation of the brightness values and/or of the color values.

Moreover, in a development of the method, it is advantageous, proceeding from a generally assumed function which describes the supplemented signal profile in the second image segment, in the method to transform this function into the spectral domain, insert the transformed function into the first function and to minimize the first function. The resultant linear equation system is solved for the spectral coefficients, and the corresponding spectral coefficients are quantized, coded and transmitted.

The development of the method in which integer arithmetic is used achieves a considerable saving of computation time and of outlay on hardware for the implementation of the method.

Furthermore, it is advantageous for the first image segment and the second image segment together to have a square shape. This enables standardized, block-based image coding methods, for example the DCT, and the existent, optimized hardware modules and software realizations to be used. This means that standard modules for block-based transform coding can be used in the context of this method for any desired first image segments, after the implementation of this method. This leads to a considerable cost saving in the case of so-called object-based image coding as well.

BRIEF DESCRIPTION OF THE DRAWINGS

The figures illustrate two exemplary embodiments of the method according to the invention which are explained in more detail below.

DETAILED DESCRIPTION OF THE PREFERRED EMBODIMENTS

Figure 1:
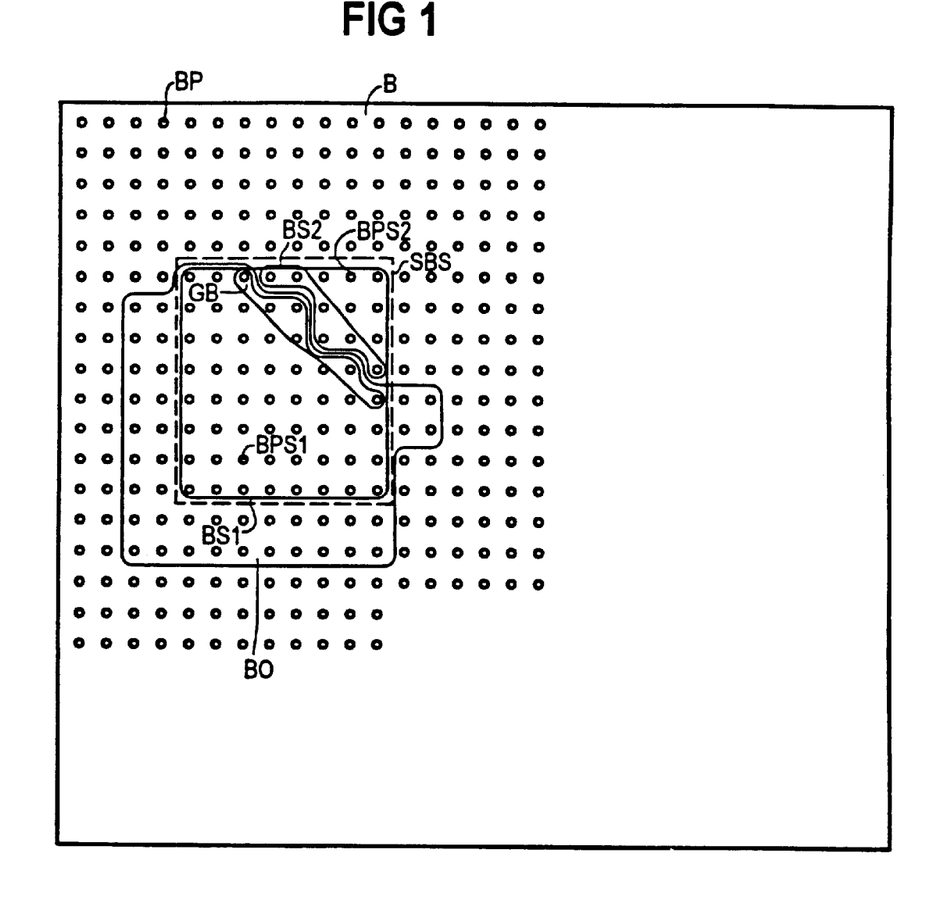
FIG. 1 is a schematic diagram in which an image with individual pixels and a first image segment and a second image segment is illustrated by way of example.

FIG. 1 illustrates a digital image B having any desired number of pixels BP. In the so-called object-based image coding methods, the pixels BP of an image B are segmented into image objects BO in accordance with their semantics. In object-based image coding methods, it may be advantageous or even necessary to encode and to transmit at least part of the image object BO jointly with pixels BP which do not belong to the image object BP. Such an exemplary case is illustrated in FIG. 1 with pixels BP of a first image segment BS1, which includes at least some of the pixels of the image object BO. Furthermore, FIG. 1 illustrates a second image segment BS2, which includes further pixels BP which do not belong to the first image segment BS1. Pixels BP which are situated in the first image segment BS1 are referred to below as pixels BPS1 of the first segment BS1. Pixels which are situated in the second image segment BS2 are referred to below as pixels BPS2 of the second image segment BS2.

Both the first image segment BS1 and the second image segment BS2 can have any desired shape in the context of the method described here.

The first image segment BS1 and the second image segment BS2 together form a composite image segment SBS, which contains all the pixels BPS1 of the first segment BS1 and all the pixels BPS2 of the second image segment BS2.

The square shape of the composite image segment SBS in the figure illustrated by way of example serves only to provide a simpler illustration of the method in the context of an advantageous development of the method. However, it is clearly evident to a person skilled in the art that there are no restrictions at all as regards the shape of the first image segment BS1, of the second image segment BS2 or even of the composite image segment SBS.

The pixels BP of the image B are usually assigned brightness values (luminance values) and/or color values. In order to provide a simpler linguistic explanation, the method is described below only with reference to brightness values assigned to the pixels BP. However, without any further change in the method steps, the method can also be carried out only for color values or for brightness values and color values, which are assigned to the pixels BP.

The brightness values (and/or color values) are usually transformed into the spectral domain in image encode methods, spectral coefficients assigned to the pixels BP being formed. The spectral coefficients of the pixels BP and/or the difference information of the spectral coefficients are quantized and transmitted in customary image encode methods.

In order also to be able to use an image encode method which is specialized in terms of a specific shape of the composite image segment SBS, for example in terms of a square shape of the composite image segment SBS, even though the first image segment BS1 has a different shape from the specific processable shape of an image segment of the image coding method, it is necessary to carry out signal extrapolation.

The signal extrapolation is also referred to as signal supplementation. The signal extrapolation is effected from the first image segment BS1 onto the second image segment BS2. The first image segment BS1 and the second image segment BS2 together form the composite image segment SBS. The composite image segment SBS has a square shape in this specific example, but the shape of the composite image segment SBS is completely arbitrary.

The brightness values of the pixels BP of the image B produce a signal profile of the brightness values of the pixels BP. Correspondingly, the brightness values of the pixels BPS1 of the first image segment BS1 form a signal profile of the brightness values for the pixels BPS1 of the first image segment BS1. The brightness values of the pixels BPS2 of the second image segment BS2 form a signal profile of the brightness values for the pixels BPS2 of the second image segment BS2.

The effect achieved by the method is that the brightness values are transformed into a spectral domain in such a way that the signal extrapolation, which is described below, as far as possible causes no unnecessary high spectral components and thus spectral coefficients.

In the course of the signal extrapolation, the signal profile of the brightness values of the pixels BPS1 of the first image segment BS1 is extrapolated onto brightness values of pixels BPS2 of the second image segment BS2.

During signal extrapolation, it is known to assign fixed brightness values to the pixels BPS2 of the second image segment BS2 the publication by I. Donescu et al., A Comparison of Efficient Methods for the Coding of Arbitrarily Shaped Image Segments, Proceedings of Picture Coding Symposium, Melbourne, pp. 13.–15. 3. 1996, pp. 181–186, 1996. However, the assignment of a fixed, uniform value for all the pixels BPS2 of the second image segment BS2 causes discontinuities in a boundary region GB between the first image segment BS1 and the second image segment BS2. The discontinuities in the signal profile of the brightness values in the boundary region GB lead to spectral coefficients of high frequencies, which lead to an increased coding outlay, quantization outlay and thus transmission outlay when encode and transmitting the digital image B.

The boundary region GB designates a region of adjacent pixels BPS1, BPS2 of the first image segment BS1 and of the second image segment BS2. The boundary region GB may not only extend over directly adjacent pixels BPS1, BPS2 of the first image segment BS1 and of the second image segment BS2, it may also be extended in each case to pixels BPS1, BPS2 which are situated further in the respective image segment BS1, BS2.

Figure 2:
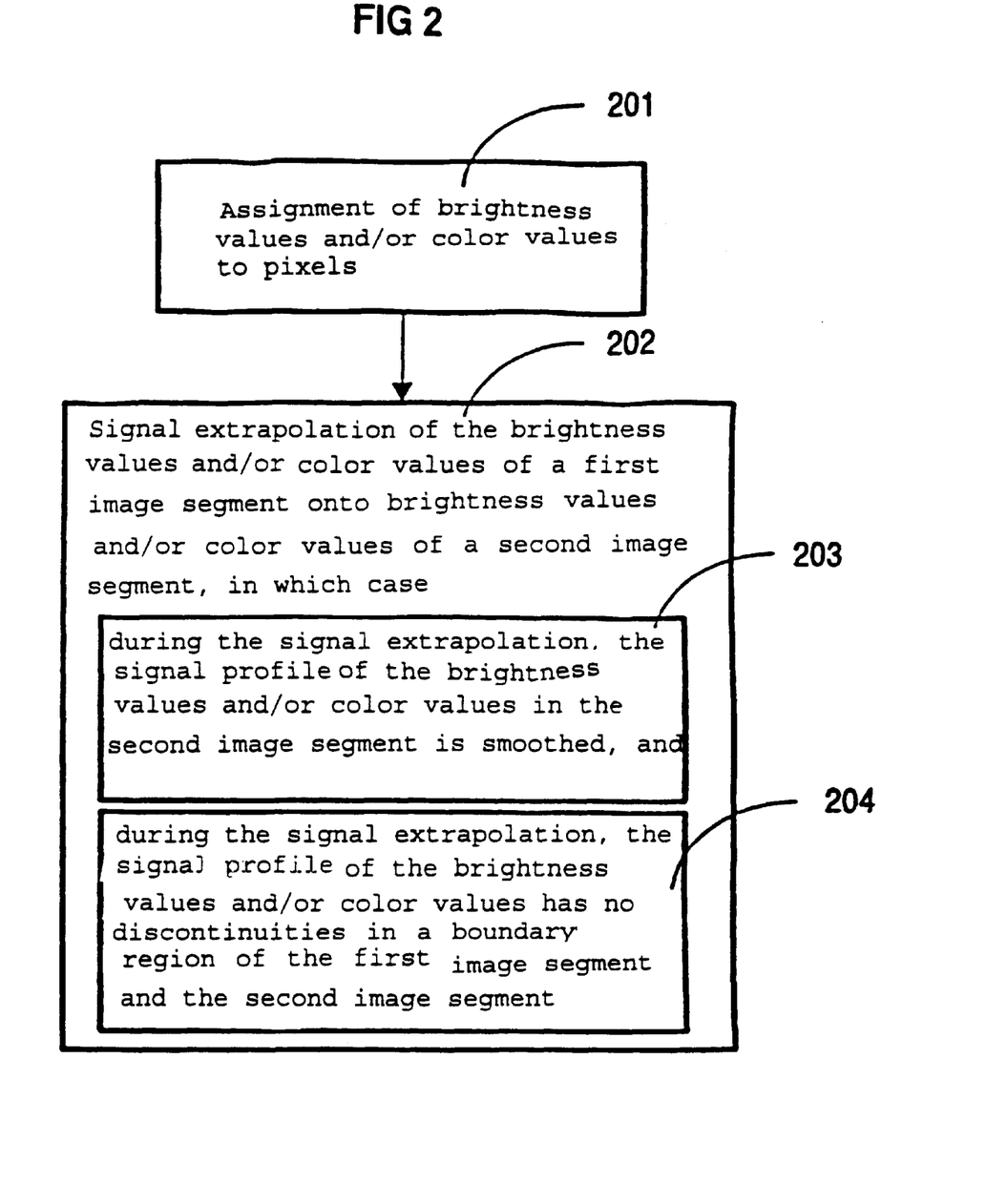
FIG. 2 is a flow diagram illustrating the individual method steps of the method.

In order to avoid the disadvantage, afflicting the known method, of discontinuities arising in the boundary region GB, in the case of the method according to the invention, after an assignment of brightness values (and/or color values) to the pixels BP of the image B in step 201 as shown FIG. 2, the brightness values of the pixels BPS1 of the first image segment BS1 are extrapolated in step 202 onto brightness values of pixels BPS2 of the second image segment BS2 (cf. FIG. 2).

The signal extrapolation is carried out in such a way that the outlay that is furthermore necessary for encoding the supplemented block, that is to say the pixels BPS2 of the second image segment BS2, is as low as possible.

In order to achieve this aim, the signal extrapolation is carried out in such a way that the signal profile of the brightness values of the pixels BPS2 of the second image segment BS2 has the smoothest possible profile, and at the same time, as far as possible no discontinuities occur in the signal profile of the brightness values in the boundary region GB between the first image segment BS1 and the second image segment BS2.

These two requirements are satisfied by virtue of the fact that, on the one hand, during the signal extrapolation the signal profile of the brightness values of the pixels BPS2 of the second image segment BS2 is smoothed in step 203, and by virtue of the fact that, on the other hand, the signal profile of the brightness values of the pixels BPS2 of the second image segment BS2 is adapted in step 204 to the brightness values of the pixels BPS1 of the first image segment BS1 in the boundary region GB between the first image segment BS1 and the second image segment BS2.

Two realization options with which the method steps described above can be realized, for example, are explained below.

Exemplary Embodiment 1
Solution in the Space Domain

Figure 3:
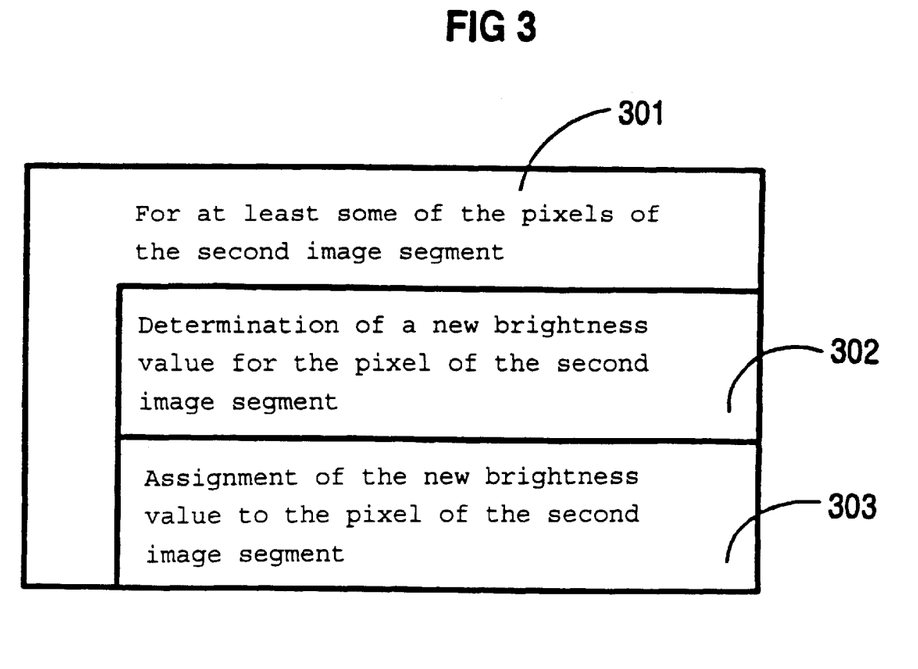
FIG. 3 is a flow diagram illustrating the individual method steps of a first exemplary embodiment of the method.

A first exemplary embodiment for the realization of "smoothed" signal extrapolation is illustrated in a flow diagram in FIG. 3.

A digital filter having a smoothing characteristic is used in this example for the signal extrapolation. Possible digital filters which can be used in this method are, for example, a local mean value filter or else a median filter or any desired digital filter having a low-pass filter characteristic.

The first exemplary embodiment is explained in more detail below with the local mean value filter, but this is in no way to be understood as the only possible solution.

As is evident, in this solution variant the filter mask of the digital filter is "placed" in step 301 onto at least some of the pixels BPS2 of the second image segment BS2, as a result of which, for at least some of the pixels BPS2 of the second image segment BS2, in accordance with the operator of the digital filter, a new brightness value, for example a mean value of the brightness values from adjacent pixels, is determined in step 302 for the respective pixel BPS2 of the second image segment BS2. The "mean value" is assigned in step 303 to the respective pixel BPS2 of the second image segment BS2.

For the specific case of the local mean value filter, the following specification for the determination of a new brightness value which is assigned to the respective pixel $x_{ij}$ of the second image segment BS2 results, for example, for the respective pixel BPS2 of the second image segment BS2. In this case, a first index i designates the respective row in which the pixel $x_{ij}$ is situated, and a column index j designates the respective column in which the respective pixel $x_{ij}$ is situated.

$$S\{x_{ij}\} = \frac{1}{4}(x_{i,j-1} + x_{i-1,j} + x_{i,j+1} + x_{i+1,j}) \quad (1)$$

In a development of the method, it is advantageous to subject the pixels BPS2 of the second image segment BS2 to the mean value operator in a sequence which begins with pixels $x_{ij}$ of the second image segment which adjoin pixels BPS1 of the first image segment BS1. In this way, as much information as possible is transferred from the signal profile of the brightness values of the pixels BPS1 of the first image segment BS1 into the second image segment BS2.

Even if, in equation (1), in each case 4 directly adjacent pixels are included in the determination of the new brightness value, which corresponds to a cross-shaped filter mask which is "placed" onto the respective pixel $x_{ij}$, then the shape of the filter mask may be arbitrary, however, that is to say it is possible to use any desired points for the determination of the new brightness value for the respective pixel $x_{ij}$.

This specification for the determination of new brightness values of pixels BPS2 of the second image segment BS2 is carried out for any desired number of pixels BPS2 of the second image segment BS2, preferably all of them.

It has emerged that it is advantageous to initialize the brightness values of the pixels BPS2 of the second image segment BS2 at the beginning of the method with a predeterminable value, preferably with a mean value of the brightness values of at least some of the pixels BPS1 of the first image segment BS1.

The result of the method is improved further in this way, thereby achieving a further reduction in the required transmission capacity.

Moreover, this development accelerates an iterative method, described below, of a development of the method since suitable initialization considerably reduces the number of required iterations in the development.

A development of the method provides for the method to be carried out iteratively, that is to say a number of times for the composite image segment SBS. The Laplace operator is used in the context of the method, e.g. the following iteration specification is used in the process:

$$x_{ij}^{(k+1)} = S\{x_{ij}^{(k)}\} \quad (2)$$

In this case, the respective iteration step is unambiguously identified by k.

When the method is carried out a number of times, that is to say in the event of a plurality of iterations, the smoothing properties are distinctly improved both in the boundary region GB and in the second image segment BS2.

However, since the improvement from one iteration step to the next becomes ever more slight with an increasing number of iterations, it is advantageous, in developments of the method, to provide a termination criterion for ending the iterations.

Different variants of a termination criterion are provided within the scope of the method.

It is possible to specify, at the beginning of the method, how often the method is to be carried out for the respective composite image segment SBS.

Furthermore, it is possible, after each iteration, to determine a sum of changes of at least some of the brightness values of the pixels BPS2 of the second image segment BS2, and to compare the sum with a sum that has been formed of changes of at least one preceding iteration. If the difference between the two sums is less than a predeterminable first threshold value SW1, then no further iteration need be carried out.

It is likewise provided for the sum of changes to be compared with an arbitrarily configured mean value of sums of preceding iterations.

Furthermore, it is provided for the following specification to be used as the termination criterion. After an iteration, a mean value of changes of at least some of the brightness values of the pixels BPS2 of the second image segment BS2 is determined and the mean value is in turn compared with a mean value of changes of the brightness values of at least one preceding iteration. If the difference between the two mean values is less than a predeterminable second threshold value SW2, then no further iteration need be carried out.

Provision is also made for carrying out the method until, after an iteration of at least one predeterminable portion of the brightness values of the pixels BPS2 of the second image segment BS2, the change in comparison with at least one preceding iteration is less than a predeterminable third threshold value SW3.

Furthermore, a development of the method provides for pixels BP which are situated outside the composite image segment SBS not to be taken into account when forming the brightness value of the pixels BPS2 of the second image segment BS2.

Correspondingly, for the specific case of the local mean value operator, for example, the factor ¼ in equations (1) and (2) is reduced by the number of pixels that are not taken into account.

Figure 5A:
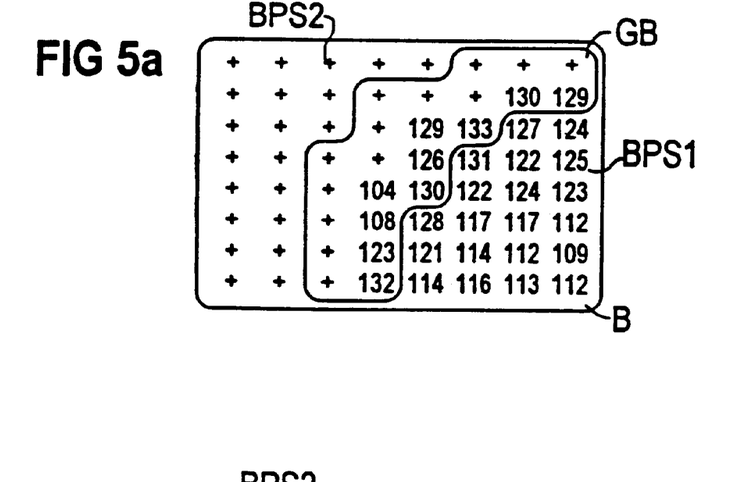
FIGS. 5a to 5c is a functional block diagram of pixels and their associated brightness values and/or color values of the image segment before and after extrapolation.

In FIG. 5a, the composite image segment SBS is described by brightness values which are illustrated by way of example. A "+" symbolically represents the brightness values of the pixels BPS2 of the second image segment BS2 at the beginning of the method.

Figure 5B:
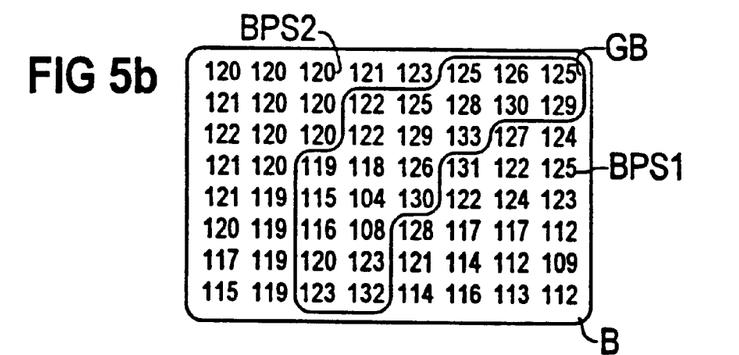

FIG. 5b illustrates the composite image segment SBS after implementation of the method using the local mean value filter in the case of initialization of the pixels BPS2 of the second image segment BS2 with the mean value 120 of the pixels BPS1 of the first image region BS1 after a number of iterations of the method.

It can clearly be discerned that, on the one hand, no relatively large discontinuities occur in the boundary region GB, and, on the other hand, it can be discerned that the signal profile of the brightness values of the pixels of the second image segment BS2 has a smoothed profile.

Exemplary Embodiment 2
Solution in the Frequency Domain

A further possibility for realizing the criteria described above is illustrated below.

Figure 4:
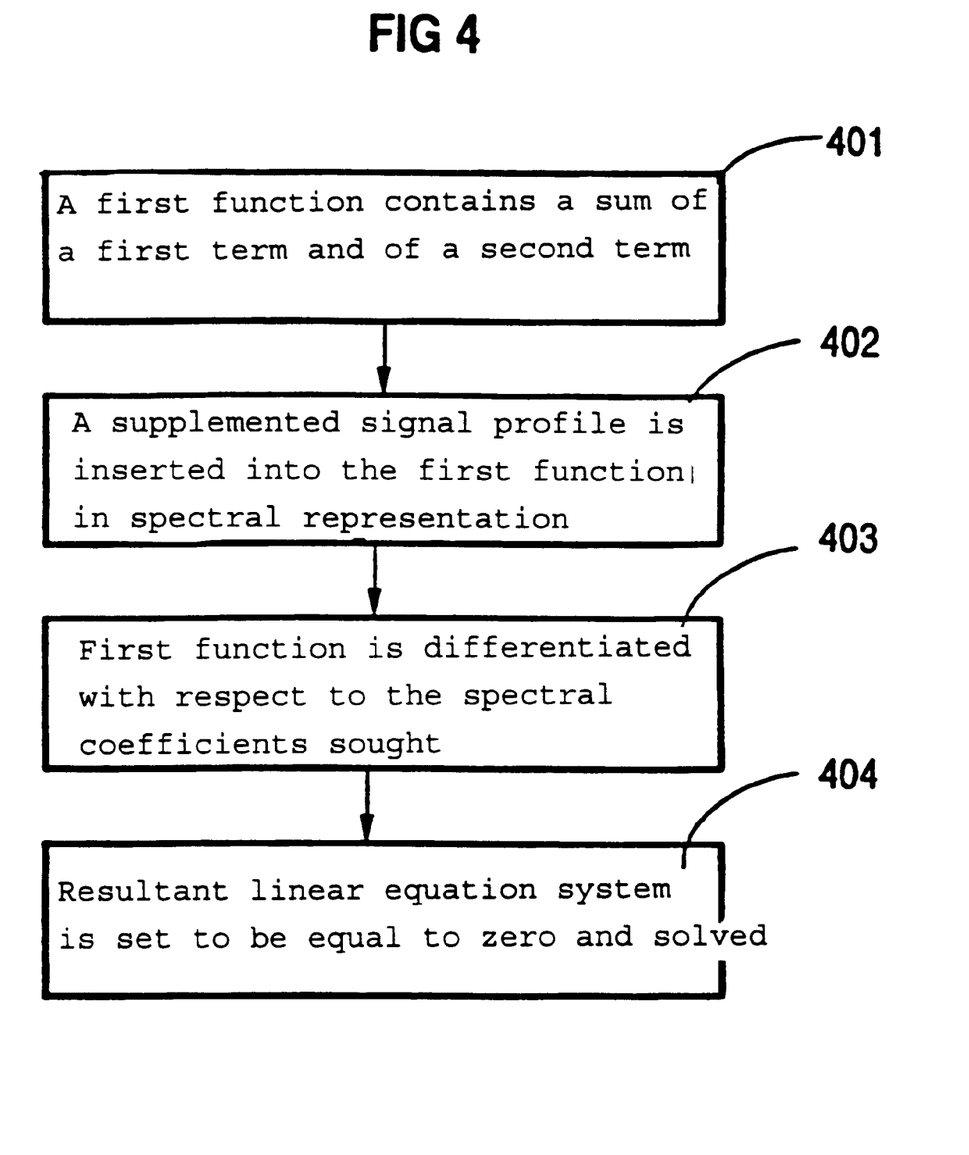
FIG. 4 is a flow diagram illustrating the individual method steps of a second exemplary embodiment of the method.

For this purpose, a first function F1 is explained below which is formed according to the following specification, for example:

$$F1 = \sum_{x_{ij} \in BS1} [f(x_{ij}) - g(x_{ij})]^2 + \lambda \cdot \sum_{x_{ij} \notin BS1} |g''(x_{ij})|^2 \qquad (3)$$

The first function F1 has two summands, a first term and a second term as shown in step 401.

$f(x_{ij})$ designates the given original function, that is to say the signal profile of the brightness values (and/or of the color values) of the pixels BP of the image B.

$g(x_{ij})$ designates a supplemented function which is formed by the signal extrapolation of the original function $f(x_{ij})$ onto the second image segment BS2. The supplemented function is referred to below as a supplemented signal profile $g(x_{ij})$.

The supplemented signal profile $g(x_{ij})$ is still not known at the beginning of the method.

The first term serves to ensure that the supplemented signal profile $g(x_{ij})$ corresponds to the original function $f(x_{ij})$ in the first image segment BS1 even after implementation of the method.

The second term generally contains a smoothness criterion for the signal profile of the pixels BPS2 of the second image segment BS2.

The smoothness criterion ensures, on the one hand, the smoothest possible signal profile of the brightness values of the pixels BPS2 of the second image segment BS2, and also the smallest possible discontinuities in the boundary region GB.

The supplemented signal profile $g(x_{ij})$ can be represented as a mathematical series in the spectral domain, that is to say a sum of products of the following structure:

$$g(x_{ij}) = \sum_{k,l} c_{kl} \cdot \varphi_{kl}(x_{ij}) \qquad (4)$$

In this case, $C_{kl}$ designates spectral coefficients and $\phi_{kl}(x_{ij})$ designates base functions of the transform coding that is respectively used, for example the discrete cosine transform (DCT). Insertion of equation (4) into the first function F1 forms in step 402 an intermediate function ZF1 of the following structure, for example:

$$ZF1 = \qquad (3)$$
$$\sum_{x_{ij} \in BS1} \left[ f(x_{ij}) - \sum_{k,l} c_{kl} \cdot \varphi_{kl}(x_{ij}) \right]^2 + \lambda \cdot \sum_{x_{ij} \notin BS1} \left| \left( \sum_{k,l} c_{kl} \cdot \varphi_{kl}(x_{ij}) \right)'' \right|^2$$

The spectral coefficients $c_{kl}$ are now present as unknowns in the intermediate function ZF1.

In order to determine the spectral coefficients $c_{kl}$, and in the process to ensure the smoothest possible signal profile in the second image segment BS2 and the smoothest possible profile in the boundary region GB, the intermediate function ZF1 is minimized.

This is done by differentiation of the intermediate function ZF1 with respect to the respective spectral coefficients $c_{kl}$ in step 403 and, in order to determine the "optimum" spectral coefficients $c_{kl}$, by setting the resultant linear equation system to be equal to 0.

This leads to an unambiguously solvable linear equation system for the determination of the "optimum" spectral coefficients $c_{kl}$ with regard to the above mentioned criteria.

After the linear equation system has been solved, the optimum spectral coefficients $c_{kl}$ are determined in step 404 directly with regard to the abovementioned criteria.

Figure 5C:
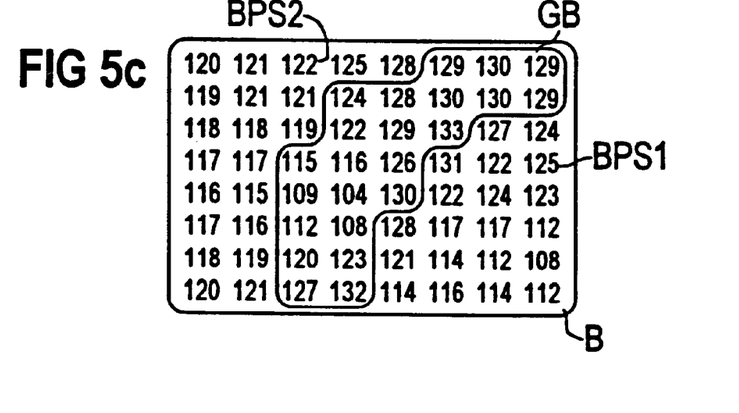

FIG. 5c illustrates the example from FIG. 5a after implementation of this method in the frequency domain for a parameter value λ=100 chosen by way of example. The parameter value λ can be chosen virtually as desired since it is highly noncritical as regards the results that can be achieved.

In the second term, it is advantageous to use any desired derivative of the supplemented signal profile $g(x_{ij})$ as the smoothness criterion.

In a development of the method, however, it is advantageous to use the second derivative since the resultant linear equation system can be solved more easily in this case.

The second term of the first function F1 need not necessarily exhibit the structure illustrated.

In a development for the entire method, that is to say for both exemplary embodiments, provision is made for using integer arithmetic in the implementation of the method.

A considerable simplification of the requisite outlay on hardware for carrying out the method is achieved by this development. Furthermore, a considerable acceleration is achieved in the implementation of the method by a computer.

The method can be carried out both in the context of transform coding, for example discrete cosine transformation, and, for example, in the context of wavelet transformation or in the context of subband transformation. The expression "in the context of such transformation" is to be understood in this context such that the signal profile which has been determined is fed to the corresponding transformation in the exemplary embodiment 1, and the base functions are chosen in accordance with the transformation chosen in the exemplary embodiment 2.

Figure 6:
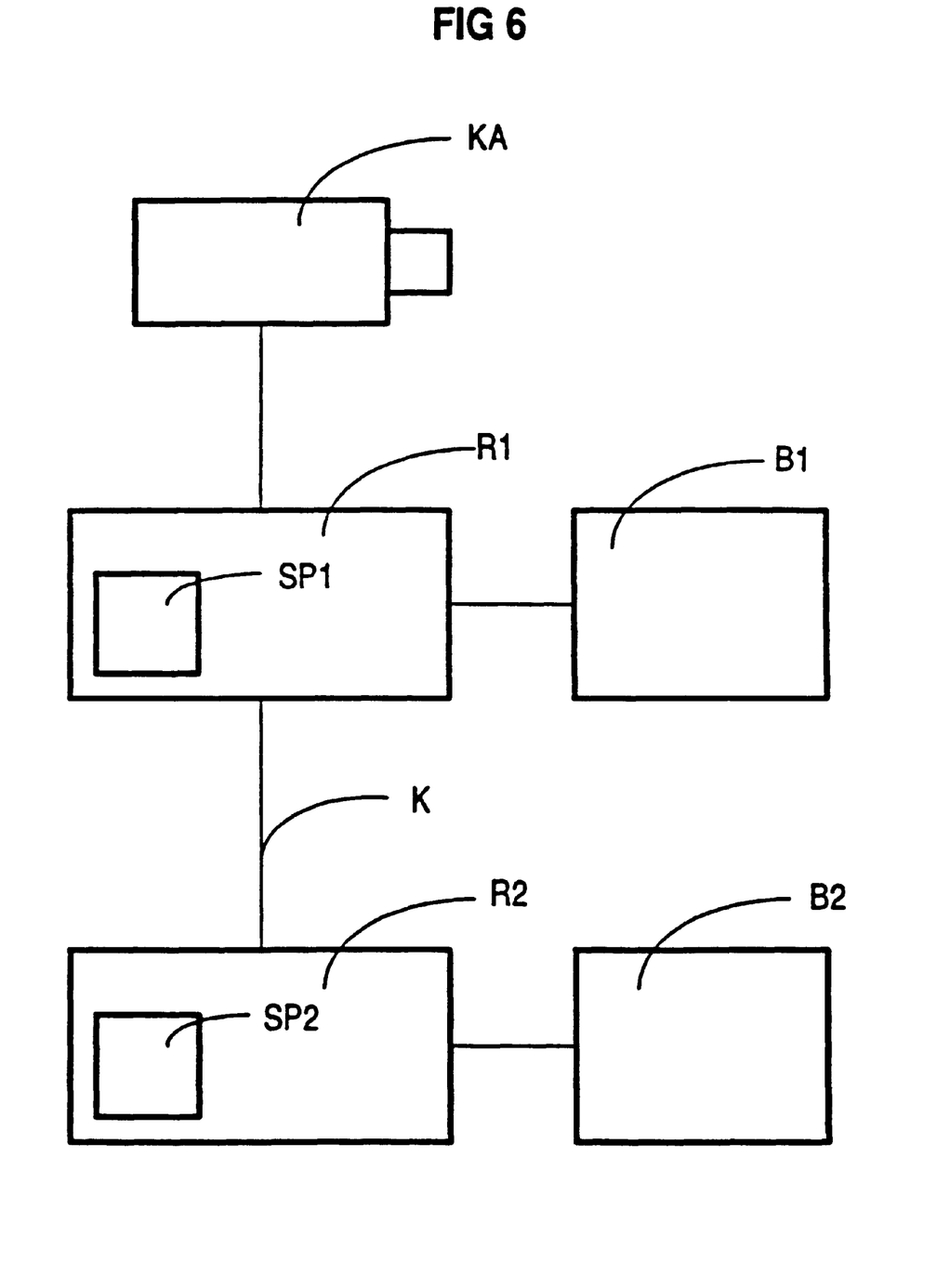
FIG. 6 shows an arrangement with a camera, two computers and two screens which is used, for example, to carry out the method.

FIG. 6 illustrates, inter alia, a first computer R1 which is used to carry out the method according to the invention.

Furthermore, FIG. 6 illustrates a camera KA which records a sequence of images which are converted in the first computer R1 to form a sequence of digital images B. The digital images B are stored in a memory SP1 of the first computer R1. Furthermore, a screen B1 is provided for the first computer R1 in this arrangement.

In the case of transmission of the digitized image B, before the digitized image B is transmitted, the method is applied to the individual image segments BS1, BS2. The resultant spectral coefficients are transmitted via a channel K to a second computer R2, where they are stored in a second memory SP2. After carrying out inverse transform coding of images and inverse conformal mapping, the digitized image B is reconstructed again in the second computer R2 and displayed to a user on the second screen B2.

Although other modifications and changes may be suggested by those skilled in the art, it is the intention of the inventors to embody within the patent warranted hereon all changes and modifications as reasonably and properly come within the scope of their contribution to the art.

What is claimed is:

1. A method for processing of pixels of a first image segment, which has any desired shape, by a computer, comprising the steps of:
   providing first and second image segments each of a plurality of pixels;
   assigning the pixels of the first image segment a brightness value and/or a color value;
   extrapolating the brightness values and/or the color values of the first image segment onto pixels of a second image segment, which has any desired shape;
   carrying out the extrapolation in such a way that a signal profile of the brightness values and/or of the color values of the pixels of the second image segment is smoothed;
   carrying out the extrapolation in such a way that the signal profile of the brightness values and/or of the color values of the pixels of the second image segment is adapted to the brightness values and/or to the color values of the pixels of the first image segment in a boundary region between the first image segment and the second image segment;
   using a digital filter having a smoothing characteristic for the extrapolation; and
   using a local mean value filter as the digital filter, wherein the digital filter has the following filtering characteristics:

$$S\{x_{ij}\}=\tfrac{1}{4}(x_{i-1,j}+x_{i-1,j}+x_{i,j+1}+x_{i+1,j}) \quad (1)$$

with $x_{ij}$ being the respective pixel, and with i being the row index and j being the column index of the respective pixel.

2. A method for processing of pixels of a first image segment, which has any desired shape, by a computer, comprising the steps of:
   providing first and second image segments each of a plurality of pixels;
   assigning the pixels of the first image segment a brightness value and/or a color value;
   extrapolating the brightness values and/or the color values of the first image segment onto pixels of a second image segment, which has any desired shape;
   carrying out the extrapolation in such a way that a signal profile of the brightness values and/or of the color values of the pixels of the second image segment is smoothed;
   carrying out the extrapolation in such a way that the signal profile of the brightness values and/or of the color values of the pixels of the second image segment is adapted to the brightness values and/or to the color values of the pixels of the first image segment in a boundary region between the first image segment and the second image segment; and
   initializing the brightness values and/or the color values of the pixels of the second image segment with a predeterminable value at a beginning of the method, wherein the predeterminable value is produced from a mean value of the brightness values and/or the color values of at least some of the pixels of the first image segment.

3. A method for processing of pixels of a first image segment, which has any desired shape, by a computer, comprising the steps of:
   providing first and second image segments each of a plurality of pixels;
   assigning the pixels of the first image segment a brightness value and/or a color value;
   extrapolating the brightness values and/or the color values of the first image segment onto pixels of a second image segment, which has any desired shape;
   carrying out the extrapolation in such a way that a signal profile of the brightness values and/or of the color values of the pixels of the second image segment is smoothed;
   carrying out the extrapolation in such a way that the signal profile of the brightness values and/or of the color values of the pixels of the second image segment is adapted to the brightness values and/or to the color values of the pixels of the first image segment in a boundary region between the first image segment and the second image segment;

for the extrapolation, forming the first function which has at least one first term and one second term;

using the first term to ensure that the signal profile of the brightness values and/or of the color values of the pixels of the first image segment is preserved as far as possible;

using the second term to ensure that the signal profile of the brightness values and/or of the color values of the pixels of the second image segment is smoothed; and using the second term to ensure that the signal profile of the brightness values and/or of the color values of the pixels of the second image segment is adapted to the brightness values and/or to the color values of the pixels of the first image segment in a boundary region between the first image segment and the second image segment.

4. The method as claimed in claim 3, further comprising the step of:

determining the first term from a difference between the signal profile of the brightness values and/or of the color values of the pixels of the first image segment and a signal profile supplemented onto the brightness values and/or the color values of the pixels of the second image segment.

5. The method as claimed in claim 3, further comprising the step of:

producing the second term from any desired differentiation of a signal profile supplemented onto the brightness values and/or the color values of the pixels of the second image segment.

6. The method as claimed in claim 5, wherein the second term is at least produced from a second differentiation of the signal profile supplemented onto the brightness values and/or the color values of the pixels of the second image segment.

7. The method as claimed in claim 3 to 6, further comprising the step of:

transforming the supplemented signal profile into the spectral domain, the transformed, supplemented signal profile having spectral coefficients, forming an intermediate function by inserting the transformed, supplemented signal profile into the first function, forming a linear equation system in that the intermediate function is differentiated with respect to the respective spectral coefficients and is set to be equal to zero, determining values of the spectral coefficients by solving the linear equation system for the spectral coefficients.

8. The method as claimed in claim 3, further comprising the step of:

using integer arithmetic in the method.

9. The method as claimed in claim 3, wherein the first image segment and the second image segment together have a square shape.

10. The method as claimed in claim 3, wherein the method is used in the context of transform encoding.

11. The method as claimed in claim 3, wherein the method is used in the context of a discrete cosine transform.

12. The method as claimed in claim 3, wherein the method is used in the context of a wavelet transform.

13. The method as claimed in claim 3, wherein the method is used in the context of a subband transform.

* * * * *